Aug. 30, 1932.  W. C. HILLERMAN  1,875,000
BRAKE
Filed Oct. 25, 1930
Fig. 1
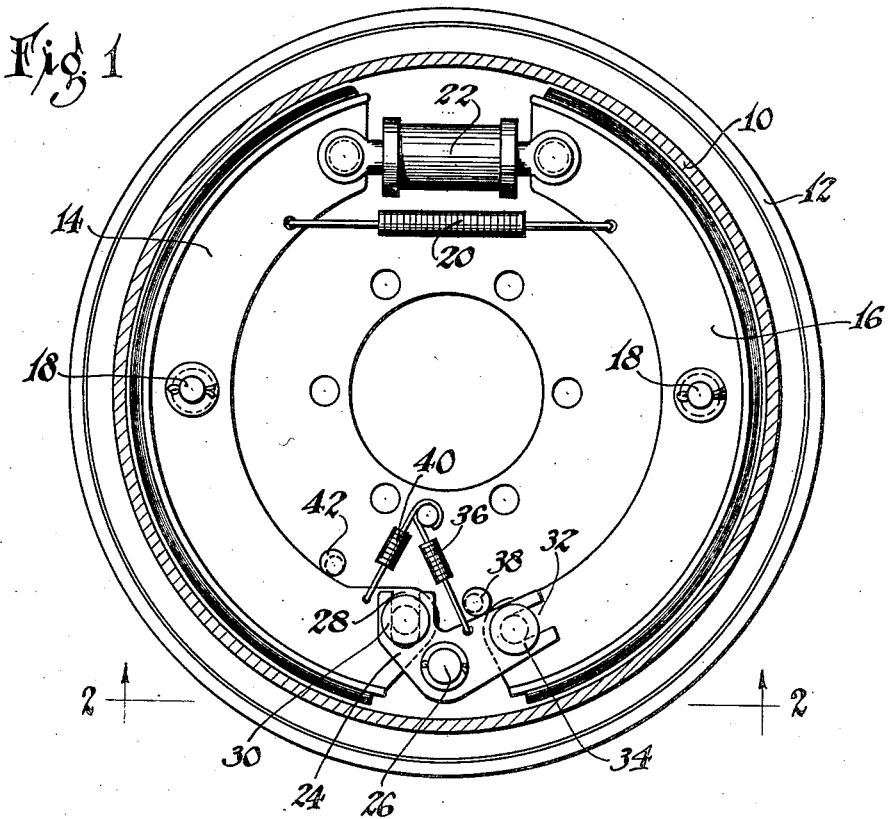
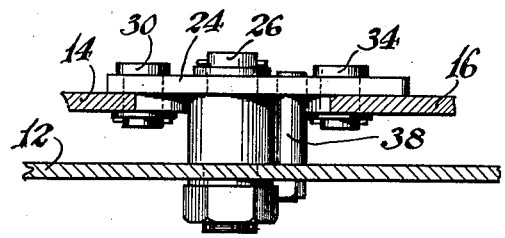
Fig. 2
INVENTOR
William C. Hillerman
BY
M. W. McConkey
ATTORNEY Patented Aug. 30, 1932

1,875,000

UNITED STATES PATENT OFFICE

WILLIAM C. HILLERMAN, OF SOUTH BEND, INDIANA, ASSIGNOR TO BENDIX BRAKE COMPANY, OF SOUTH BEND, INDIANA, A CORPORATION OF ILLINOIS

BRAKE

Application filed October 25, 1930. Serial No. 491,167.

This invention relates to brakes and is illustrated as embodied in an internal expanding brake for an automobile. An object of the invention is to provide an anchorage for the brake shoes or their equivalents, which will give a self-energizing effect in intensifying the brake action at least when the vehicle is moving forward.

In one arrangement, the anchorage of the brake includes a lever which is pivotally mounted, for example on a fixed anchor pin, and which is connected to parts carried by the friction means. In the arrangement of the drawing, one arm of the lever is connected to one shoe and the other arm is connected to the other shoe, preferably by pin-and-slot or other lost motion connections.

Various features of novelty relate to the shape and mounting of the lever and to the provision of means for positioning it when the brake is released and to other novel and desirable constructions and arrangements which will be apparent from the following description of the illustrative embodiment shown in the accompanying drawing, in which:

Figure 1 is a vertical section through the brake just inside the head of the brake drum and showing the brake shoes in side elevation; and Figure 2 is a partial section on the line 2—2 of Figure 1, showing the brake anchorage.

The brake selected for illustration includes a rotatable drum 10, at the open side of which is a support such as a backing plate 12 and within which is shown the friction means of the brake. The friction means illustrated in this particular drawing include a pair of brake shoes 14 and 16 having any suitable steady rests 18 or the like and arranged to be applied against the resistance of a return spring 20 by means such as a hydraulic control 22.

According to the present invention, the anchorage of the brake includes means for introducing a self-energizing effect, at least when the vehicle is moving forward (i. e. when the drum is turning counterclockwise) and which is illustrated as including a novel bell crank lever 24 having one arm extending generally radially and the other generally circumferentially and which is pivotally mounted on an anchor post or the like 26 carried by the backing plate.

The radially extending arm of the bell crank lever 24 is shown formed with a substantially radial slot 28 embracing a pin 30 carried by the shoe 14 while the opposite arm of the bell crank lever is shown formed with a substantially circumferential slot 32 embracing a pin 34 carried by the shoe 16. The position of the bell crank lever 24 when the brake is released is determined by a spring 36 tensioned between the bell crank lever and the backing plate and urging the lever against a stop such as an adjustable eccentric 38 mounted on the backing plate. The released position of shoe 14 may be determined by means such as a spring 40 tensioned between the shoe and backing plate and urging the shoe inwardly against a stop such as an adjustable eccentric 42.

It will be observed that the brake operates substantially as an anchored-shoe brake when the drum is turning clockwise with the vehicle moving backward, although there is a slight component due to the torque of the shoe 16 tending to turn the lever 24 about the anchor pin 26 which acts on the shoe 14 in a direction tending to force the lower end of that shoe against the brake drum. In the opposite direction of drum rotation, with the vehicle moving forward, there is a very substantial self-energizing effect due to the action of the shoe 14 on the radial arm of the lever 24 tending to rock the lever in a clockwise direction about the anchor post 26 to force the lower end of the shoe 16 outwardly against the brake drum.

While one illustrative embodiment has been described in detail, it is not my intention to limit the scope of the invention to that particular embodiment or otherwise than by the terms of the appended claims.

I claim:

1. A brake comprising a pair of friction devices, applying means for exerting a balanced spreading force on the shoes adjacent their ends, and an anchorage for the shoe ends opposite the applying means and including a pivotally mounted bellcrank lever having one arm radially slotted and embracing a projection on one shoe and having the other arm circumferentially slotted and embracing a projection on the other shoe.

2. A brake comprising a pair of friction devices, applying means for exerting a balanced spreading force on the shoes adjacent their ends, and an anchorage for the shoe ends opposite the applying means and including a pivotally mounted bellcrank lever having one arm extending radially and engaging one shoe and having the other arm extending circumferentially and engaging the other shoe.

In testimony whereof, I have hereunto signed my name.

WILLIAM C. HILLERMAN.